March 12, 1940. C. E. ZIMMERMAN Re. 21,399

APPLICATION OF COSMETICS

Original Filed Sept. 2, 1939

Inventor:
Charles E. Zimmerman
By: Truman, Sweet, Albrecht & Weidman
Attys.

Reissued Mar. 12, 1940

Re. 21,399

UNITED STATES PATENT OFFICE 21,399

APPLICATION OF COSMETICS

Charles E. Zimmerman, Chicago, Ill.

Original No. 2,176,831, dated October 17, 1939, Serial No. 293,191, September 2, 1939. Application for reissue January 29, 1940, Serial No. 316,255

15 Claims. (Cl. 132—78.5)

My invention relates to the application of cosmetics and includes among its objects an advance and improvement in the facility with which a precisely controlled amount of powdered cosmetic, such as rouge, may be applied to the skin.

Figure 1:
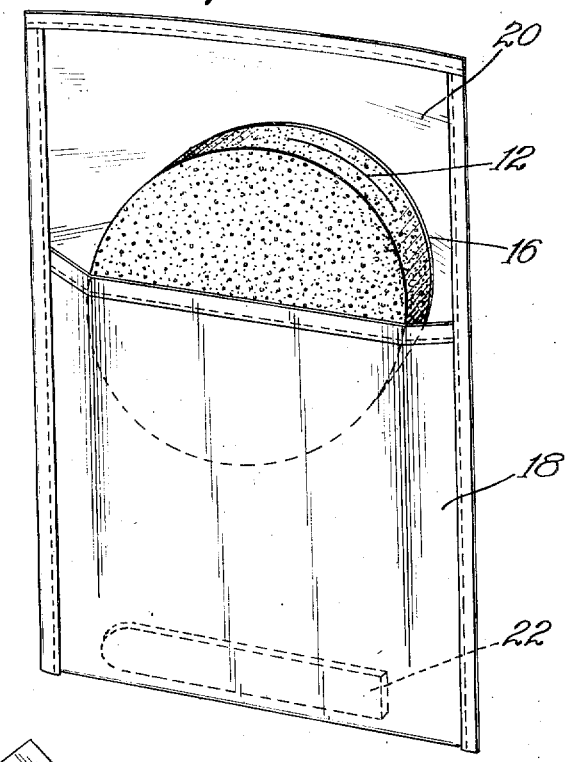
Figure 1 is a perspective view of a package including a cosmetic applicator, a filling tool, and a suitable carrying case.
Figure 2:
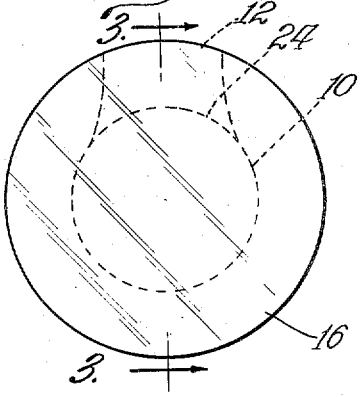
Figure 2 is a front elevation of such an applicator.

In the embodiment of the invention selected for illustration, the applicator itself is a flat circular disc 2½ inches in diameter and ½ inch thick. Substantially midway between its opposite faces the body of the applicator is slitted, as by the insertion of a sharp knife or other cutting tool, to form interior slit 10 having substantially the contour indicated in dotted lines in Figure 2.

Figure 3:
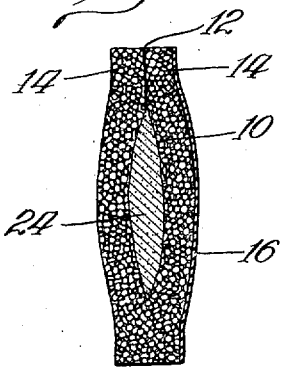
Figure 3 is a section on line 3—3 of Figure 2 of the applicator with a charge of cosmetic in position therein ready for use.

The mouth of the slit at 12 subtends an angle of substantially 45 degrees and the material adjacent the lip indicated at 14 in Figure 3 has a thickness on each side of the mouth of the slit of the order of magnitude of from five to seven times the length of the mouth of the slit.

The applicator is of sheet latex rubber of the type having a very slight skin, or relatively impermeable layer along one face thereof. Such a skin is indicated at 16 in the drawing, but in the drawing its thickness has been somewhat exaggerated for the sake of clearness. The skin 16 has a thickness of the order of magnitude of five-thousandths of an inch.

The applicator is preferably provided with a carrying case, or envelope 18, of impermeable material, such as Pliofilm, having a flap 20 long enough to fold over the end of the pocket when the applicator is inside. In the same unit package I provide a small flat and wooden paddle 22 for a purpose to be hereinafter described.

Figure 4:
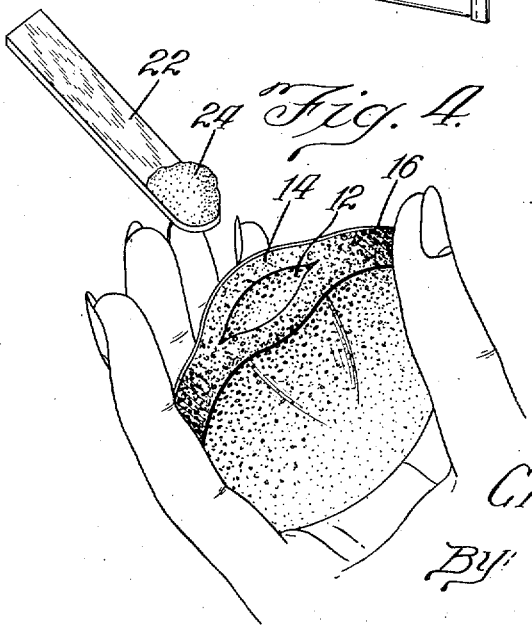
Figure 4 is a perspective view indicating one method of filling the applicator.
Figure 5:
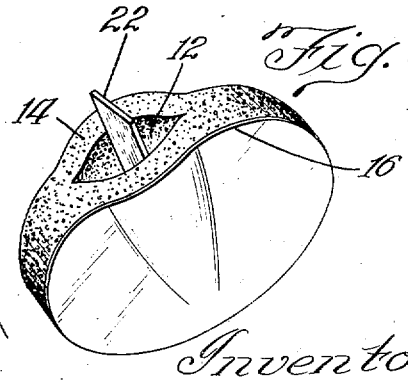
Figure 5 is a perspective view indicating an alternative method.

The user may fill the interior of the applicator with the shade and quality of powder selected by the user. One method of filling is as illustrated in Figure 4, by holding the applicator in one hand and pinching it to cause the slit 12 to gape open, while a charge of powder 24 is picked up on the paddle 22 and dropped into the opening. An alternative method is illustrated in Figure 5. The paddle 22 is thrust into the bottom of the slit, and turned sideway to hold the slit open. Then, with a teaspoon or another paddle or the like, powder can be dropped in beside the inserted paddle.

In either event, the applicator ready for use will be as in Figure 3. After filling, the user strokes or pats the applicator against the back of one hand a half dozen times or so until powder begins to find its way out of the porous side of the applicator. No material is removed by the slitting of the applicator, so that in the condition of Figure 3, the rubber itself is distorted and under stress and tends to press against and confine the powder inside it.

Thereafter, the applicator may be stroked on the user's cheek, or wherever it is desired to apply the powder.

With an applicator of the right degree of porosity, the rate at which the powder finds its way to the surface during such use, is approximately constant and also small enough so that the user soon acquires the habit of building up an application to the proper amount by repeated stroking, as distinguished from the common method of applying a material excess and then removing the excess. For instance, on the cheek, the user will customarily wipe once around the periphery of a relatively large circular area, twice around a smaller circle and then pat two or three times on the center and the task is finished. This eliminates a great deal of untidiness as compared with the methods heretofore in common use.

The applicator is made of latex, being a rubber product, of rubber substantially devoid of filler, and formed into finished shape while in a liquid state. It is essential that the porosity of the material be high, and that the individual openings in the material interconnect freely. I have made many attempts to secure sponge rubber having the desired characteristics, but all those attempts were failures. Even with latex, there are many products that are entirely unsuitable for this purpose. To secure suitable results the degree of porosity and the size and shape of the individual openings must be controlled within narrow limits. I have found, after repeated tests, that for best results the density should be substantially 0.004 pound per cubic inch.

Variation between 0.0035 and 0.0045 pound per cubic inch, with a product in which the individual openings vary from microscopic sizes up to a maximum of the order of magnitude of 0.075 inch, does not change the results so materially as to be at all objectionable. And different but still satisfactory results can be obtained with densities as low as 0.0018 pound per cubic inch, and as high as 0.0060 pound per cubic inch. Below 0.0018 the material not only discharges powder too freely, but is of insufficient mechanical strength, and above 0.0060 the discharge is too slow. Thus, for the special purpose involved herein, densities between 0.0018 and 0.0060 pound per cubic inch are the densities required to approximate the advantages which are maximum at about 0.0040 pound per cubic inch.

It is possible to produce porous latex such that the number of pores of each different size drops off abruptly at about a predetermined maximum, such as the maximum of 0.075 inch specified above. In such a product there may be isolated widely spaced pores twice as large as the maximum aimed at in manufacture, but they are so few and so widely separated as to have no material effect on the characteristics of the finished article.

At the present time, after repeated attempts, I have been able to produce a satisfactory product only from latex, as distinguished from sponge rubber, and the densities and pore sizes specified have reference only to latex. It will be obvious that if technological improvements made it possible to secure an identical porous structure of sponge rubber, the pore size would be substantially unchanged, but the average density would be increased in proportion to the greater specific gravity of rubber, which contains a filler, compared with latex, which does not.

In such a product the so-called "skin" merely has pores enough smaller than the main mass to prevent percolation of powders. The skin remains permeable to liquids and gases.

This application is a continuation in part of my co-pending application Serial No. 284,046 filed July 12, 1939.

Without further elaboration, the foregoing will so fully explain my invention that others may, by applying knowledge current at the time of application, readily adapt the same for use under various conditions of service.

I claim:

1. A cosmetic applicator comprising a body having the general shape of a circular disc; said body being of porous latex having pores of varying sizes up to a maximum of the order of magnitude of 0.075 inch, and a density of approximately 0.0040 pound per cubic inch; said body having an internal slit normally closed throughout its entire extent and debouching through the periphery of said body through an opening of smaller dimensions than the main portion of the slit; said body having a skin formed on one surface only; said skin having pores smaller than the pores in the remainder of said body and being relatively impermeable to pulverulent materials, but permeable to liquids and gases; said skin having a thickness of the order of magnitude of five-thousandths of an inch.

2. A cosmetic applicator comprising a body having the general shape of a disc; said body being of porous latex having pores of varying sizes up to a maximum of the order of magnitude of 0.075 inch, and a density of approximately 0.0040 pound per cubic inch; said body having a normally closed internal slit debouching through the periphery of said body through an opening of smaller dimensions than the main portion of the slit; said body having a skin formed on one surface only; said skin being relatively impermeable to pulverulent materials, but permeable to liquids and gases.

3. A cosmetic applicator comprising a body having the general shape of a disc; said body being of porous latex having pores of varying sizes up to a maximum of the order of magnitude of 0.075 inch, and a density of approximately 0.0040 pound per cubic inch; said body having a skin formed on one surface only; said skin being relatively impermeable to pulverulent materials; said body having a normally closed internal slit debouching through the periphery of said body through an opening of smaller dimensions than the main portion of the slit, whereby a charge of powder inserted by dilating said slit, is held pressed together by the resilience of said body.

4. A cosmetic applicator comprising a body having the general shape of a disc; said body being of porous latex and being permeable to pulverulent materials, said body having a normally closed internal slit debouching through the periphery of said body through an opening of smaller dimensions than the main portion of the slit, whereby a charge of material inserted by dilating said slit is held pressed together by the resilience of said body; said body having a skin formed on one surface only; said skin being relatively impermeable to pulverulent materials, but permeable to liquids and gases.

5. A cosmetic applicator comprising a body having the general shape of a disc; said body being of a porous rubber product having pores of varying sizes up to a maximum of the order of magnitude of 0.075 inch, and, when made of substantially unfilled latex, a density of approximately 0.0040 pound per cubic inch; said body having an internal slit debouching through the periphery of said body through an opening of smaller dimensions than the main portion of the slit; said body having a skin formed on one surface only; said skin having pores smaller than the pores in the remainder of said body and being relatively impermeable to pulverulent materials.

6. As a new article of manufacture an applicator designed for use in applying cosmetic powder and comprising a pad-like body formed of porous rubber material having pores of varying sizes up to a maximum of the order of magnitude of 0.075 inch, and when made of unfilled latex rubber, a density of between 0.0018 and 0.0060 pound per cubic inch, and embodying a normally closed slit leading into its interior and forming a pocket for a charge of cosmetic powder.

7. As a new article of manufacture, an applicator designed for use in applying cosmetic powder and comprising a pad-like body formed of porous latex rubber with communicating pores of varying sizes up to a maximum of the order of magnitude of 0.075 inch, and a density between 0.0018 and 0.0060 pound per cubic inch, and having a normally closed slit leading into and terminating within its interior and forming a pocket for a charge of powder.

8. As a new article of manufacture, an applicator designed for use in applying cosmetic powder and comprising a pad-like body formed of porous latex rubber with communicating pores of varying sizes up to a maximum of the order of magnitude of 0.075 inch, and a density of between 0.0018 and 0.0060 pound per cubic inch, and having a normally closed slit leading into and terminating within its interior and forming a pocket for a charge of powder, said body also having on one side face thereof only an integral skin substantially impermeable to cosmetic powder but permeable to liquids and gases.

9. As a new article of manufacture, an applicator designed for use in applying cosmetic powder and comprising a pad-like body formed of porous latex rubber with communicating pores of various sizes up to a maximum of the order of magnitude of 0.075 inch, and a density of approximately 0.004 pound per cubic inch and having a normally closed slit leading into and terminating in its interior and forming a pocket for a charge of powder.

10. As a new article of manufacture, an applicator designed for use in applying cosmetic powder and comprising a disc-like body formed of porous latex rubber with communicating pores of varying sizes up to a maximum of the order of magnitude of 0.075 inch, and a density of approximately 0.004 pound per cubic inch, and having a normally closed slit leading from the periphery thereof to the interior and forming a pocket for a charge of cosmetic powder, said body embodying on one side face thereof only an integral skin substantially impermeable to cosmetic powder but permeable to liquids and gases.

11. As a new article of manufacture, an applicator designed for use in applying cosmetic powder and comprising a pad-like body formed of rubber material having numerous minute communicating pores therein whereby it is rendered permeable to cosmetic powder, and embodying a normally closed flat slit leading from the periphery thereof into its interior and forming a pocket for a charge of powder, said body embodying in addition to said slit and on one side face thereof only an integral skin substantially impermeable to the powder but permeable to liquids and gases.

12. As a new article of manufacture, an applicator designed for use in applying cosmetic powder and comprising a pad-like body formed of porous latex rubber with communicating pores of varying sizes up to a maximum of the order of magnitude of 0.075 inch, and a density of no more than 0.006 pound per cubic inch, and having a normally closed slit leading into and terminating within its interior and forming a pocket for a charge of powder.

13. As a new article of manufacture, an applicator designed for use in applying powder and comprising a pad-like body formed of porous latex rubber with communicating pores of varying sizes up to a maximum of the order of magnitude of 0.075 inch, and a density of no more than 0.006 pound per cubic inch, and having a normally closed slit leading into its interior and forming a substantially central pocket for a charge of powder, said body having such inherent resiliency that when the pocket therein is filled with powder it so presses against the powder that the latter is free to flow to the body exterior via the pores but is not likely in connection with use of the applicator to pass through the entrance part of the slit.

14. As a new article of manufacture, an applicator designed for use in applying cosmetic powder and comprising a disc-like body formed of porous latex rubber with communicating pores of varying sizes up to a maximum of the order of magnitude of 0.075 inch, and with a density of approximately 0.004 pound per cubic inch, and a normally closed flat slit leading from the periphery thereof into its interior and forming a pocket for a charge of powder, said body having such inherent resiliency that when the pocket therein is filled with powder it so presses against the powder that the latter is free to flow to the exterior of the body via the pores but is not likely in connection with use of the applicator to pass through the entrance and part of the slit, and embodying in addition to said slit on one side face thereof only an integral skin substantially impermeable to the powder but permeable to liquids and gases.

15. As a new article of manufacture, an applicator adapted for use in applying cosmetic powder and comprising a pad-like body formed of porous latex rubber with communicating pores of varying sizes up to a maximum of the order of magnitude of 0.075 inch and a density between 0.0018 and 0.0060 pound per cubic inch, and embodying on one side face thereof only an integral skin having minute pores of materially less magnitude than the pores in the main part of the body and a density materially greater than that of the body whereby it is rendered substantially impermeable to cosmetic powder but permeable to liquids and gases.

CHARLES E. ZIMMERMAN.